United States Patent
Lee et al.

(10) Patent No.: US 7,944,824 B2
(45) Date of Patent: May 17, 2011

(54) TERMINAL OF PORTABLE INTERNET SYSTEM AND METHOD OF TRANSMITTING UPLINK DATA IN TERMINAL

(75) Inventors: Seung-Que Lee, Daejeon (KR); Nam-Hoon Park, Daejeon (KR); Jee-Hwan Ahn, Daejeon (KR)

(73) Assignees: Samsung Electronics Co., Ltd. (KR); Electronics and Telecommunications Research Institute (KR); KT Corporation (KR); SK Telecom Co., Ltd. (KR); KTFreetel Co., Ltd. (KR); Hanaro Telecom., Inc. (KR)

( * ) Notice: Subject to any disclaimer, the term of this patent is extended or adjusted under 35 U.S.C. 154(b) by 320 days.

(21) Appl. No.: 11/792,222

(22) PCT Filed: May 17, 2005

(86) PCT No.: PCT/KR2005/001430
§ 371 (c)(1),
(2), (4) Date: May 12, 2008

(87) PCT Pub. No.: WO2006/059823
PCT Pub. Date: Jun. 8, 2006

(65) Prior Publication Data
US 2009/0109844 A1    Apr. 30, 2009

(30) Foreign Application Priority Data
Dec. 2, 2004   (KR) .................. 10-2004-0100304

(51) Int. Cl.
*G01R 31/08*   (2006.01)

(52) U.S. Cl. .................. 370/230; 370/236; 370/412
(58) Field of Classification Search .......... 370/200–253, 370/272–390, 431–546, 85.1, 412, 395
See application file for complete search history.

(56) References Cited

U.S. PATENT DOCUMENTS

| | | | |
|---|---|---|---|
| 5,140,587 A | * | 8/1992 | Mueller et al. ............ 370/460 |
| 5,970,062 A | | 10/1999 | Bauchot |
| 6,154,464 A | * | 11/2000 | Feuerstraeter et al. ....... 370/463 |
| 6,810,098 B1 | | 10/2004 | Paul et al. |
| 7,336,606 B2 | * | 2/2008 | Romano et al. ............. 370/230 |

(Continued)

FOREIGN PATENT DOCUMENTS
EP   1 478 118 A1   11/2001

(Continued)

OTHER PUBLICATIONS
Portable Internet (HP:) System Technology.

*Primary Examiner* — Ricky Ngo
*Assistant Examiner* — Iqbal Zaidi
(74) *Attorney, Agent, or Firm* — The Farrell Law Firm, P.C.

(57) ABSTRACT

A terminal of a portable Internet system comprising a medium access control (MAC) layer and a physical layer, the MAC layer comprising: a classifier classifying packets into classes; a delayer calling queue operating functions when a predetermined period of time is passed after the packets are classified by the classifier; a wait queue storing packets by the queue operating functions; and a packet processor processing the packet in the wait queue and transmitting the processed packet to the physical layer.

6 Claims, 4 Drawing Sheets

U.S. PATENT DOCUMENTS

| | | | |
|---|---|---|---|
| 2002/0126675 A1 | 9/2002 | Yoshimura et al. | |
| 2003/0037117 A1 | 2/2003 | Tabuchi | |
| 2003/0048791 A1* | 3/2003 | De Cnodder et al. | 370/395.42 |
| 2003/0093526 A1 | 5/2003 | Nandagopalan | |
| 2004/0102198 A1* | 5/2004 | Diener et al. | 455/456.1 |
| 2004/0131074 A1 | 7/2004 | Kurth | |
| 2004/0244008 A1 | 12/2004 | Lee | |
| 2005/0185651 A1* | 8/2005 | Rinne | 370/395.1 |
| 2006/0212633 A1 | 9/2006 | Kasper | |
| 2007/0160213 A1* | 7/2007 | Un et al. | 380/270 |

FOREIGN PATENT DOCUMENTS

| | | | |
|---|---|---|---|
| EP | 1478118 | * | 5/2004 |
| EP | 1478118 | * | 11/2004 |
| JP | 07-006043 | | 1/1995 |
| JP | 09-034730 | | 2/1997 |
| JP | 10-070554 | | 3/1998 |
| JP | 2000-151713 | | 5/2000 |
| JP | 2001-274795 | | 10/2001 |
| JP | 2001-308914 | | 11/2001 |
| JP | 2002-247532 | | 8/2002 |
| JP | 2002-271366 | | 9/2002 |
| JP | 2003-058382 | | 2/2003 |
| JP | 2003-529947 | | 10/2003 |
| KR | 1020010057809 A | | 7/2001 |
| SE | 516328 | | 12/2001 |
| WO | WO 99/37099 | | 7/1999 |
| WO | WO02061553 | * | 8/2002 |
| WO | WO 2004086689 | * | 3/2003 |
| WO | WO 2004/086689 A2 | | 10/2004 |

* cited by examiner

[Fig. 1]
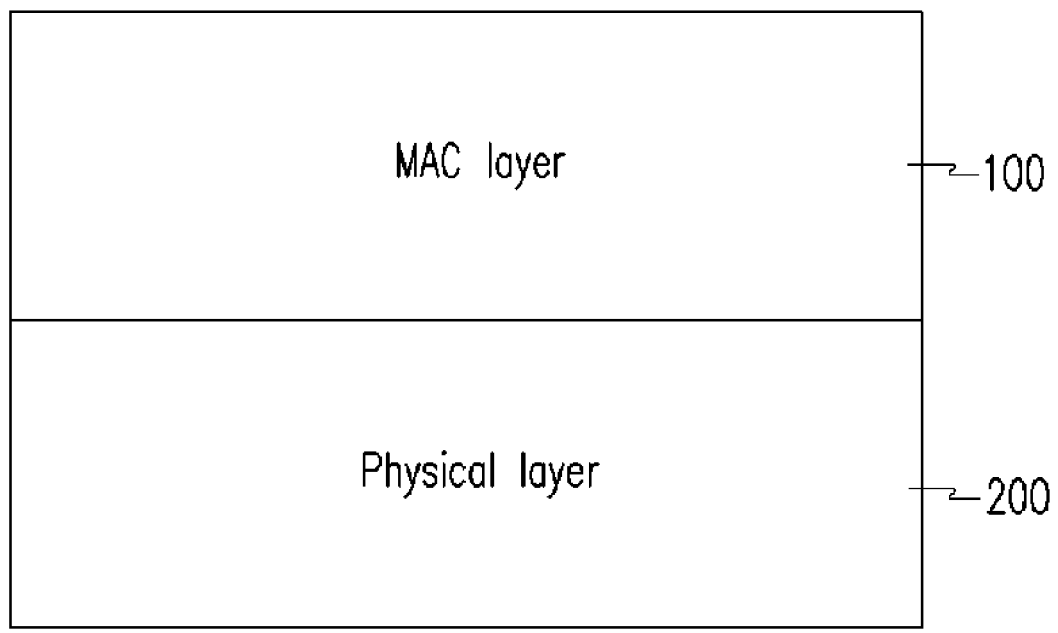

[Fig. 2]
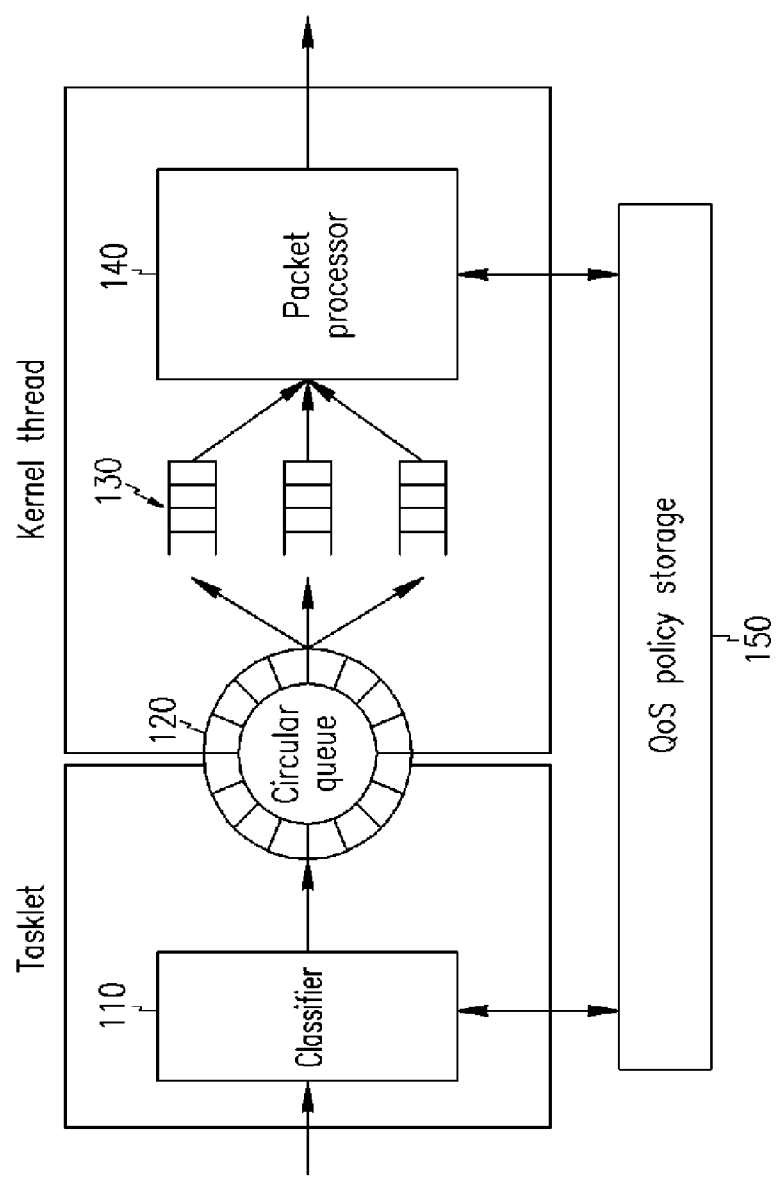

[Fig. 3]
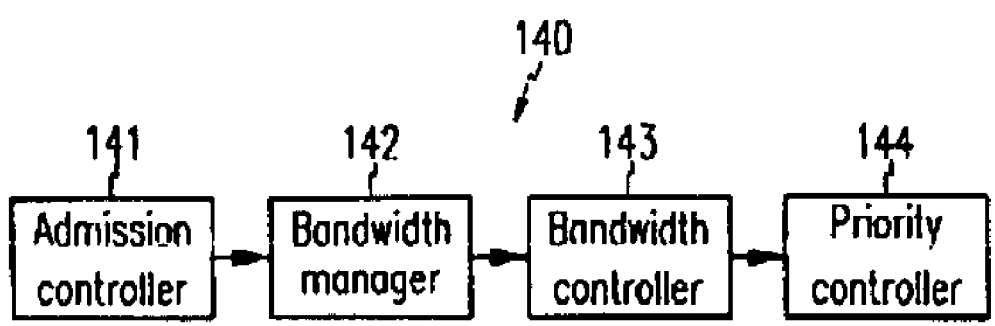

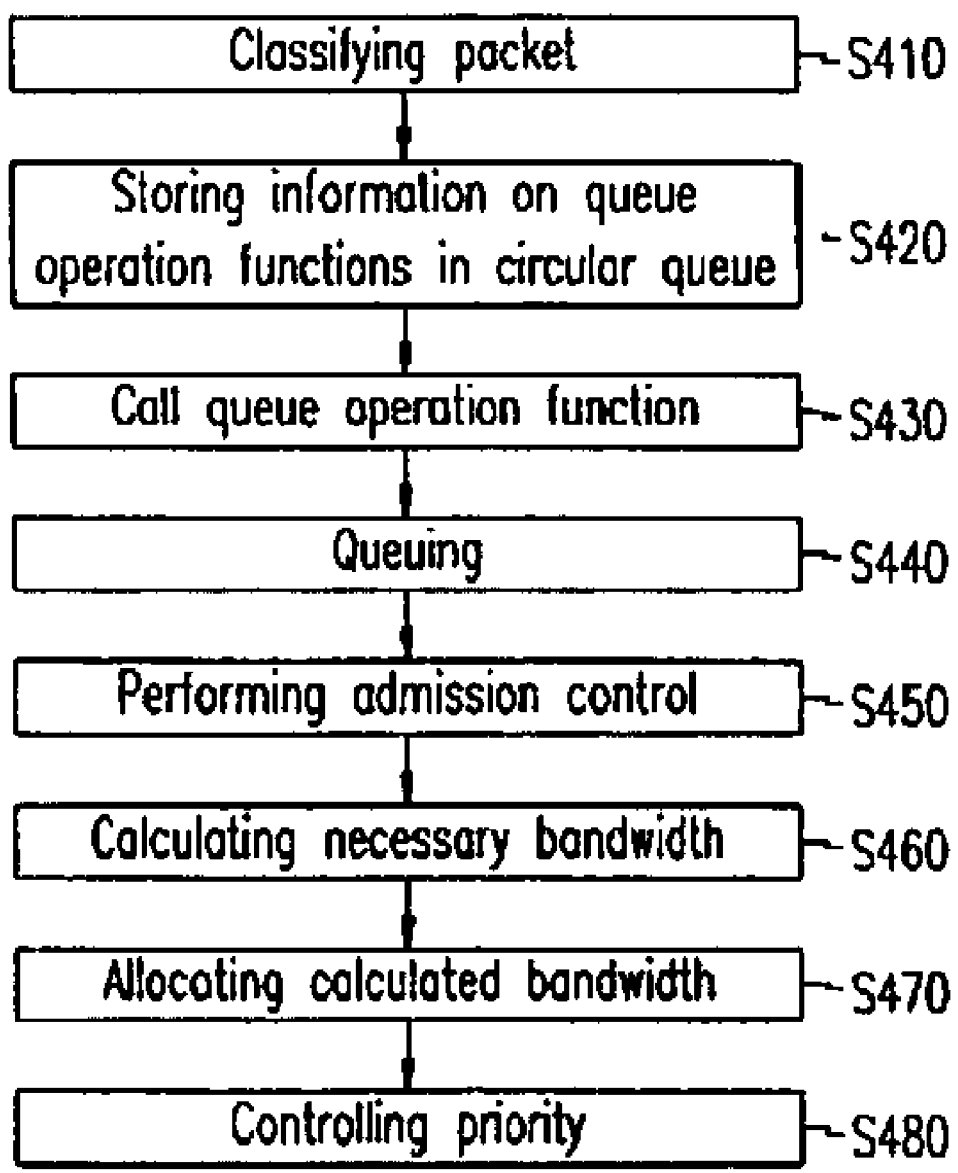
[Fig. 4]

TERMINAL OF PORTABLE INTERNET SYSTEM AND METHOD OF TRANSMITTING UPLINK DATA IN TERMINAL

TECHNICAL FIELD

The present invention relates to a terminal of a portable Internet system, a method for transmitting uplink data, and a recording medium of the terminal.

BACKGROUND ART

A portable Internet system is a next generation communication technology that supports mobility for local area data communication using a fixed access point such as a wireless local area network (WLAN), and standardization in the portable Internet system is in progress by IEEE 802.16 and IEEE 802.16e. Similar to a mobile communication service, the portable Internet system supports a handover between a subscriber and a base station, and dynamically allocates an Internet Protocol (IP) address according to movement of the subscriber.

The portable Internet system employs orthogonal frequency division multiplexing (OFDM) for modulation and demodulation, and frequency division multiple access (FDMA)/time division multiple access (TDMA) for user multiplexing. Such a portable Internet system guarantees quality of service by classifying packets for priority-based transmission. Therefore, a terminal queues uplink data from an application layer in a wait queue and prioritizes the queued data by applying various QoS policies before transmission.

In the terminal of the portable Internet system, a classifier classifies the uplink data, a packet processor prioritizes the queued uplink data in the wait queue for priority-based transmission. Herein, an interrupt and an interrupt handling routine are called by a Linux kernel and a tasklet is scheduled. The tasklet calls the classifier such that user packets are passed to the classifier of the mobile terminal. In other words, the classifier and wait queue operation-related routines are operated as a part of the tasklet.

A process of prioritizing the packets in the wait queue is similar to a daemon process that independently runs in the background, ignoring interrupts, and thus processed by a kernel thread of the Linux kernel. Therefore, the uplink data is processed by the classifier operated by the tasklet and the packet processor is operated by the kernel thread by using the wait queue as common data.

However, the tasklet has an interrupt-based routine and thus an atomic operation is not guaranteed. In other words, another tasklet may be driven before completion of a given tasklet. Considering that the uplink data is an asynchronous event, frequent occurrence of the event may generate frequent interrupts thereby causing a plurality of tasklets to be overlapped.

The classifier performs a queue insertion operation to store data in the wait queue. The queue insertion operation changes a link structure in a link list by nature, and thus modification of a data structure related to the queue insertion operation must be mutually exclusive. Otherwise, the data structure may be unexpectedly changed thereby causing an undesirable operation.

However, the classifier is operated by the tasklet and thus the atomic operation may not be guaranteed, as described. Thus, there still exists a risk of erroneous modification of the data structure since the queue related operations may not be mutually exclusive. Moreover, the erroneous modification of the data structure may cause a system fault.

DISCLOSURE OF INVENTION

Technical Problem

It is an advantage of the present invention to provide a method for guaranteeing mutual exclusiveness of queue operations of a classifier when a terminal of a portable Internet system transmits uplink data.

Technical Solution

In one aspect of the present invention, there is provided a terminal of a portable Internet system comprising a medium access control (MAC) layer and a physical layer. The MAC layer includes a classifier, a delayer, a wait queue, and a packet processor. The classifier classifies packets into a class. The delayer calls queue operating functions when a predetermined period of time is passed after the packets are classified by the classifier. The wait queue stores packets by the queue operating functions. The packet processor processes the packet in the wait queue and transmits the processed packet to the physical layer.

The delayer comprises a circular queue storing a function pointer and a function argument of the queue operating function.

In another aspect of the present invention, there is provided a method for transmitting uplink data of a terminal of a portable Internet system. The method includes classifying packets into a class, calling a queue operating function when a predetermined period of time is passed after the classification of the packets; and queuing the packets by using the called queue operating function.

The calling the queue operating function includes storing the classified packets and information on the queue operating function in a circular queue; and sequentially extracting the information on the queue operating function stored in the circular queue.

ADVANTAGEOUS EFFECTS

According to embodiments of the present invention, a classifier shares a circular queue with a wait queue and a packet processor, and the wait queue is operated by a tasklet, and the wait queue and the packet processor are operated by the kernel thread thereby enabling robust uplink data transmission.

BRIEF DESCRIPTION OF THE DRAWINGS

The accompanying drawings, which are incorporated in and constitute a part of the specification, illustrate an embodiment of the invention, and, together with the description, serve to explain the principles of the invention.

FIG. 1 illustrates a layer structure of a terminal of a portable Internet system according to an embodiment of the present invention.

FIG. 2 illustrates a media access control (MAC) layer of the terminal according to an embodiment of the present invention.

FIG. 3 schematically illustrates a structure of a packet processor of FIG. 2.

FIG. 4 illustrates a method for uplink data transmission according to an embodiment of the present invention.

BEST MODE FOR CARRYING OUT THE INVENTION

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

A terminal of a portable Internet system and a method for uplink data transmission of the terminal according to an embodiment of the present invention will be described in more detail with reference to the accompanying drawings.

FIG. 1 illustrates a layer structure of a terminal of a portable Internet system according to an embodiment of the present invention.

As shown therein, the layer structure of the terminal includes a medium access control (MAC) layer 100 and a physical layer 200. Uplink data generated from an application layer (not shown) is transmitted to the physical layer 200 through the MAC layer 100.

The physical layer 200 performs radio data communication including modulation/demodulation and a radio frequency process, and the MAC layer 100 above the physical 200 is a protocol that controls access of the uplink data to the physical layer 200. The MAC layer 100 classifies uplink data packets generated from the application layer, stores the classified uplink data packets, and transmits the stored data packet to the physical layer 200 for priority-based transmission according to a quality of service policy.

Referring to FIG. 2 and FIG. 3, a MAC layer of the terminal according to an embodiment of the present invention will be described in more detail. FIG. 2 shows a structure of processing uplink data of the MAC layer 100, and FIG. 3 illustrates a schematic structure of a packet processor of FIG. 2.

As shown therein, the MAC layer 100 includes a classifier 110, a circular queue 120, a wait queue 130, and a packet processor 140. The classifier 110 and the packet processor 140 are designed to classify and process the data based on the policy of QoS. The classifier 110 provided in a first portion, and the wait queue 130 and the packet processor 140 provided in a second portion, share the circular queue 120.

The classifier 110 of an uplink data processor 110 classifies packets generated from the application layer, and stores a function pointer and a function argument for queue related operations in the circular queue 120.

The circular queue 120 has a head for writing and a tail for reading, and thus the writing and reading in the circular queue 120 are independently performed within the capacity of a buffer. Information on the function pointer and function argument written in the circular queue 120 are sequentially read by a kernel thread such that functions for the queue related operations are sequentially called. In other words, the functions for the queue related operations are called after a predetermined period of time is delayed from when the classifier classifies the packets, and the circular queue 120 performs as a delayer that delays functional calls. The packets are stored in the wait queue 130 by function operations when the functions for the queue related operations are sequentially called in the circular queue 120.

The packet processor 140 processes the packets queued in the wait queue 130 and transmits the processed packets according to the priority-based QoS policy. Referring to FIG. 3, the packet processor 140 includes an admission controller 141, a bandwidth manager 142, a bandwidth controller 143, and a priority controller 144.

The admission controller 141 determines whether to remove or admit the data queued in the wait queue 130 according to traffic load. The bandwidth manager 142 calculates a necessary bandwidth for the data in the wait queue 130, and the bandwidth controller 243 requests the calculated bandwidth. The priority controller 144 extracts the data in the wait queue 130 according to priority-based QoS policy and transmits the extracted data within a length of the guaranteed bandwidth.

The classifier 110 is called by the tasklet of the Linux kernel for the uplink data which is an asynchronous event, and the wait queue 130 and the packet processor 140 are performed through a process that is similar to a daemon process that continuously and independently runs in the background, ignoring interrupts, and thus may be processed by a kernel thread of the Linux kernel. Therefore, the classifier 110 is operated by the tasklet, and the wait queue 130 and the packet processor 140 are operated by the kernel thread to process the uplink data while sharing the circular queue 120.

Referring to FIG. 4, a method for transmitting uplink data according to an embodiment of the present invention will be described. FIG. 4 illustrates a flow of uplink data transmission according to an embodiment of the present invention.

As shown therein, when the uplink data is generated, the classifier 110 classifies uplink data packets according to the QoS policy in Step S410 and stores a function pointer and a function argument for a queue operation in the circular queue 120 in Step S420. The function pointer and function argument stored in the circular queue 120 are read by the kernel thread after a predetermined period of time is delayed, and the corresponding function is then called to perform the corresponding queue operation in Step S430. When the corresponding function is called, queuing is performed to store the packet classified by the classifier 110 in the wait queue 130 in Step S440.

Herein, information on functions stored in the circular queue 120 is sequentially read by the kernel thread and queue-related functions are sequentially called. Therefore, mutual exclusiveness of a queue-related operation is guaranteed to thereby prevent a data structure from being incorrectly modified during the queue-related operations.

The admission controller 141 of the packet processor 140 controls admission by using the wait queue 130 after the queuing, and a packet having the lowest priority is discarded according to the traffic load of the network. The bandwidth manager 142 analyzes the packet queued in the wait queue 130 to calculate a necessary bandwidth in Step S460, and the bandwidth controller 144 requests the calculated bandwidth and allocates the calculated bandwidth in Step S470. The priority controller 144 extracts the packets in the wait queue 130 in priority order and for priority-based transmission using the allocated bandwidth within a length of the allocated bandwidth. The packet is then transmitted to a base station (BS) through the physical layer 200. The queuing and packet processing are continuously performed similar to the daemon in Steps S450 to S480.

The method for uplink data transmission is implemented by a program and stored in a recording medium so as to be processed by an information processor of the terminal. The recording medium includes a compact disk-read only memory CD-ROM, a random access memory RAM, a floppy disk, a hard disk, and a magnetooptical disk, etc.

As described, the classifier shares the circular queue with the wait queue and the packet processor, and the wait queue is operated by the tasklet and the wait queue and the packet processor are operated by the kernel thread thereby enabling robust uplink data transmission.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

The invention claimed is:

1. A terminal of a portable Internet system comprising a medium access control (MAC) layer and a physical layer, and wherein the MAC layer comprises:
    a classifier classifying packets into classes;
    a delayer including a circular queue storing a function pointer and a function argument of each of queue operating functions, the delayer sequentially calling the queue operating functions by sequentially extracting the function pointer and the function argument from the circular queue when a predetermined period of time is passed after the packets are classified by the classifier;
    a wait queue storing the packets by the queue operating functions; and
    a packet processor processing the packet in the wait queue and transmitting the processed packet to the physical layer,
    wherein the classifier is operated by a tasklet of a kernel, and the wait queue and the packet processor are operated by a kernel thread, and
    wherein the packet processor comprises:
    an admission controller performing admission controlling by using the wait queue;
    a bandwidth manager analyzing packets in the wait queue and calculating a necessary bandwidth;
    a bandwidth controller requesting and allocating the calculated bandwidth; and
    a priority controller transmitting the packets in the wait queue according to priority of each packet by using the allocated bandwidth.

2. The terminal of claim 1, wherein the function pointer and the function argument stored in the circular queue are sequentially extracted by a kernel thread.

3. The terminal of claim 2, wherein the circular queue is shared by the classifier and the wait queue.

4. The terminal of claim 1, wherein the kernel includes a Linux kernel.

5. The terminal of claim 1, wherein the classes are determined according to a policy of Quality of Service (QoS).

6. A method for transmitting uplink data of a terminal of a portable Internet system, the method comprising:
    classifying packets into classes;
    storing information on queue operating functions in a circular queue;
    sequentially calling the queue operating functions by sequentially extracting the information on the queue operating functions stored in the circular queue when a predetermined period of time is passed after the classification of the packets;
    queuing the packets by using the called queue operating functions; wherein the classifying the packets is operated by a tasklet, and the queuing is operated by a kernel thread; and
    performing admission control for the queued packets;
    calculating a necessary bandwidth for the packets admitted by the admission control;
    allocating the calculated bandwidth; and
    transmitting the packet according to priority by using the allocated bandwidth.

* * * * *